(12) United States Patent
Desai et al.

(10) Patent No.: US 9,737,067 B2
(45) Date of Patent: Aug. 22, 2017

(54) AUTONOMOUS SPRAYING PLATFORM

(71) Applicants: Pinakin Desai, Naperville, IL (US); Stephen M Faivre, Sycamore, IL (US); Peter Joseph Zerillo, Naperville, IL (US)

(72) Inventors: Pinakin Desai, Naperville, IL (US); Stephen M Faivre, Sycamore, IL (US); Peter Joseph Zerillo, Naperville, IL (US)

(73) Assignee: MEMES ASSOCIATES, LTD., Naperville, IL (US)

( * ) Notice: Subject to any disclaimer, the term of this patent is extended or adjusted under 35 U.S.C. 154(b) by 0 days.

(21) Appl. No.: 15/141,713

(22) Filed: Apr. 28, 2016

(65) Prior Publication Data

US 2016/0316736 A1 Nov. 3, 2016

Related U.S. Application Data

(60) Provisional application No. 62/154,169, filed on Apr. 29, 2015.

(51) Int. Cl.
| | |
|---|---|
| *A01M 7/00* | (2006.01) |
| *A01G 25/09* | (2006.01) |
| *A01B 69/04* | (2006.01) |
| *A01B 79/00* | (2006.01) |

(Continued)

(52) U.S. Cl.
CPC ......... *A01M 7/0075* (2013.01); *A01B 69/008* (2013.01); *A01B 79/005* (2013.01); *A01G 25/09* (2013.01); *A01C 23/047* (2013.01); *A01M 7/005* (2013.01); *A01M 7/0042* (2013.01); *A01M 7/0053* (2013.01); *A01M 7/0057* (2013.01); *A01M 7/0071* (2013.01);

(Continued)

(58) Field of Classification Search
CPC .............. A01M 7/0075; A01M 7/0071; A01M 7/0042; A01M 7/005; A01M 7/0053; A01M 7/0057; A01M 7/0078; A01M 7/0082; A01M 7/0085; A01G 25/09; B05B 13/005
USPC .................. 239/149, 159, 172, 175, 161–169
See application file for complete search history.

(56) References Cited

U.S. PATENT DOCUMENTS

| | | | | |
|---|---|---|---|---|
| 3,565,340 A | * | 2/1971 | Meinert | A01M 7/0075 239/168 |
| 3,866,834 A | * | 2/1975 | Shannon | A01M 7/0053 172/509 |

(Continued)

*Primary Examiner* — Arthur O Hall
*Assistant Examiner* — Joseph A Greenlund
(74) *Attorney, Agent, or Firm* — Justin Lampel

(57) ABSTRACT

An autonomous spraying platform is provided. The autonomous spraying platform has a main frame platform supported by a first and a second wheel in tandem. Supported by the main frame platform and extended perpendicular thereto are extended booms having multiple movable and/or telescoping arms which touch the ground on each side by small wheels for balance and sensing of the ground. Liquids, foams or powders, which may carry pesticides, herbicides, insecticides, fungicides, fertilizers or other pro-growth ingredients, may be dispensed across the bottom edge of the extended booms. The main frame platform may be controlled locally by sensors utilizing GPS (or other positioning technology) or remotely by a computer or even alive operator. The device may allow for real-time precise delivery of pro-growth materials to plants.

10 Claims, 7 Drawing Sheets

(51) Int. Cl.
    *A01C 23/04*      (2006.01)
    *B05B 13/00*      (2006.01)
(52) U.S. Cl.
    CPC ......... *A01M 7/0078* (2013.01); *A01M 7/0082* (2013.01); *A01M 7/0085* (2013.01); *B05B 13/005* (2013.01)

(56) References Cited

U.S. PATENT DOCUMENTS

| | | | | |
|---|---|---|---|---|
| 3,994,437 A * | 11/1976 | Kitterman | ........... | A01M 7/0092 239/1 |
| 4,673,130 A * | 6/1987 | Simpson | ............. | A01M 7/0075 239/167 |
| 4,834,249 A * | 5/1989 | Dahl | .................... | A01M 7/0078 212/258 |
| 5,630,547 A * | 5/1997 | Klemenhagen | ..... | A01M 7/0057 239/161 |
| 5,887,390 A * | 3/1999 | Schulz | ................ | A01M 7/0075 212/245 |
| 5,992,759 A * | 11/1999 | Patterson | ............... | A01C 23/00 239/159 |
| 6,027,039 A * | 2/2000 | Mercil | ................ | A01M 7/0075 239/159 |
| 6,036,275 A * | 3/2000 | Hansen | .................... | B60P 1/283 239/657 |
| 6,116,368 A * | 9/2000 | Lyons | ...................... | B60K 6/46 180/165 |
| 6,402,051 B1 * | 6/2002 | Humpal | ................. | A01B 73/02 239/165 |
| 6,422,483 B1 * | 7/2002 | Yocom | ................ | A01M 7/0053 239/159 |
| 6,491,234 B2 * | 12/2002 | Beggs | ................ | A01M 7/0053 239/166 |
| 6,889,915 B2 * | 5/2005 | Guesdon | ............. | A01M 7/0071 239/166 |
| 7,063,273 B2 * | 6/2006 | Hahn | ................... | A01M 7/0064 239/159 |
| 7,275,700 B2 * | 10/2007 | Miles, Jr. | ................ | A01C 15/18 222/610 |
| 7,364,096 B1 * | 4/2008 | Sosnowski | ........... | A01C 23/008 239/166 |
| 7,431,221 B2 * | 10/2008 | Thompson | ........... | A01B 73/065 239/166 |
| 7,458,528 B2 * | 12/2008 | Ridgeway | ................ | B62J 99/00 180/53.8 |
| 7,631,817 B2 * | 12/2009 | Thompson | .......... | A01M 7/0075 180/53.3 |
| 7,857,239 B2 * | 12/2010 | Hahn | .................... | A01M 7/0039 239/156 |
| 8,777,126 B2 * | 7/2014 | Ringer | ...................... | F16J 12/00 239/147 |
| 8,833,680 B2 * | 9/2014 | Ellingson | ............. | B05B 12/008 239/159 |
| 2003/0052188 A1 * | 3/2003 | Maliteare | ............ | A01M 7/0075 239/159 |
| 2004/0251313 A1 * | 12/2004 | Burgess | ............... | A01M 7/0014 239/100 |
| 2006/0144598 A1 * | 7/2006 | Johnson | ................ | A62C 27/00 169/24 |
| 2006/0201075 A1 * | 9/2006 | Rivas | ................... | A01M 7/0071 52/111 |
| 2008/0191055 A1 * | 8/2008 | Ellsworth | ........... | A01M 7/0053 239/166 |
| 2012/0012673 A1 * | 1/2012 | Hedegaard | .......... | A01M 7/0014 239/165 |
| 2012/0111689 A1 * | 5/2012 | Atkins | .................... | F16F 15/30 192/84.3 |
| 2014/0326804 A1 * | 11/2014 | Mangen | ................. | A01G 25/09 239/172 |
| 2014/0361094 A1 * | 12/2014 | Michael | ............... | A01C 23/042 239/1 |
| 2015/0181802 A1 * | 7/2015 | Blunier | ................ | A01B 59/048 239/159 |
| 2015/0201552 A1 * | 7/2015 | Bouten | ............... | A01M 7/0075 248/558 |
| 2015/0213118 A1 * | 7/2015 | Sun | ..................... | G06F 17/2247 707/736 |
| 2015/0375247 A1 * | 12/2015 | Funseth | .................. | B05B 12/04 239/68 |

* cited by examiner

AUTONOMOUS SPRAYING PLATFORM

CROSS REFERENCE TO RELATED APPLICATIONS

The following application is based on U.S. provisional application Ser. No. 62/154,169 filed on Apr. 29, 2015 the entire contents of which are incorporated by reference.

BACKGROUND OF THE INVENTION

An autonomous spraying platform is provided. The autonomous spraying platform has a main frame platform supported by a first and a second wheel in tandem. Supported by the main frame platform and extended perpendicular thereto are extended booms having multiple movable and/or telescoping arms which touch the ground on each side by small wheels for balance and sensing of the ground. Liquids, foams or powders, which may carry pesticides, herbicides, insecticides, fungicides, fertilizers or other pro-growth ingredients, may be dispensed across the bottom edge of the extended booms. The main frame platform may be controlled locally by sensors utilizing GPS (or other positioning technology) or remotely by a computer or even a live operator. The device may allow for real-time precise delivery of pro-growth materials to plants.

Over the years, attempts have been made to provide efficient agricultural spraying machines. For example, U.S. Pat. No. 7,669,784 to Sobolik discloses an agricultural sprayer implement having a wheeled main body and a cantilevered boom. The cantilevered boom has a plurality of sections which fold with respect to one another and place significant torsional stress on one or more of the boom sections. The interior boom sections have a cylindrical tube as a lower member and preferably a square tube as an upper member with a plurality of braces extending between them. The cylindrical tube resists the torsional stress which is maximized during folding of the boom. The square tube resists particularly an upward/downward bending moment.

Further, U.S. Pat. No. 6,422,483 to Yocom discloses a vehicle-borne spray boom apparatus having multiple articulated sections that are foldable and individually supported with respect to the ground to maintain a consistent and optimal distance between the boom sections and the ground on hilly and uneven terrain. A center section of the boom is mounted on a forward facing frame element of the vehicle, and boom arms extending from either end of the center section each comprise at least first and second sections, each supported by a ground-engaging wheel. Each first section is coupled at one end to the center section to permit vertical inclination with respect to the center section, and each second section is coupled at one end to a respective first section to permit vertical inclination with respect to such first section. The coupling between the central and first sections additionally permits relative horizontal inclination, and releasable latch mechanisms are triggered upon full horizontal extension of the first sections to maintain proper alignment between the first and center sections.

Still further, U.S. Pat. No. 5,176,322 to Sailor discloses a device for spraying liquid onto a crop with the assistance of directed air streams. Air is impelled into a central air chamber, through left and right hollow swiveling joints along extended air booms to pass out through outlet funnels. Associated with each outlet funnel is a spray nozzle which directs spray liquid into the outgoing air stream. The extended booms can be pivoted to a trailing position behind the device. The flattened outlet funnels together with the positioning of the nozzles provided an enhanced, directed atomized spray.

However, these patents fail to describe an autonomous spraying platform which is easy to use and efficient. Further, these patents fail to describe an autonomous spraying platform which has a first and a second wheel in tandem.

SUMMARY OF THE INVENTION

An autonomous spraying platform is provided. The autonomous spraying platform has a main frame platform supported by a first and a second wheel in tandem. Supported by the main frame platform and extended perpendicular thereto are extended booms having multiple movable and/or telescoping arms which touch the ground on each side by small wheels for balance and sensing of the ground. Liquids, foams or powders, which may carry pesticides, herbicides, insecticides, fungicides, fertilizers or other pro-growth ingredients, may be dispensed across the bottom edge of the extended booms. The main frame platform may be controlled locally by sensors utilizing GPS (or other positioning technology) or remotely by a computer or even a live operator. The device may allow for real-time precise delivery of pro-growth materials to plants.

An advantage of the proposed autonomous spraying platform is that the proposed autonomous spraying platform may deliver a full gambit of pro-growth plant elements without the need to have a conventionally defined pathway through the field.

Still another advantage of the present autonomous spraying platform is that the present autonomous spraying platform may automatically adjust to the contours of the environment in real-time and may self-balance while maintaining a consistent boom relationship to the crops that are being treated.

An advantage of the present autonomous spraying platform is that the present autonomous spraying platform may have a solar panel which provides at least a portion of the power supply needed to operate the autonomous spraying platform.

And another advantage of the present autonomous spraying platform is that the present autonomous spraying platform has a lower weight than other agricultural input delivery systems therein allowing the present device to reduce soil compaction.

Still another advantage of the present autonomous spraying platform is that the wheels of the present device may be flywheels wherein the rotational energy of the moving wheels is utilized for balance.

In an another embodiment, the present autonomous spraying platform may dispense a powder instead of a liquid wherein the powder maybe propelled through the device and out of external openings with the aid of compressed air.

For a more complete understanding of the above listed features and advantages of the present autonomous spraying platform reference should be made to the detailed description and the drawings. Further, additional features and advantages of the invention are described in, and will be apparent from, the detailed description of the preferred embodiments.

DETAILED DESCRIPTION OF THE PREFERRED EMBODIMENTS

An autonomous spraying platform is provided. The autonomous spraying platform has a main frame platform supported by a first and a second wheel in tandem. Supported by the main frame platform and extended perpendicular thereto are extended booms having multiple movable and/or telescoping arms which touch the ground on each side by small wheels for balance and sensing of the ground. Liquids, foams or powders, which may carry pesticides, herbicides, insecticides, fungicides, fertilizers or other pro-growth ingredients, may be dispensed across the bottom edge of the extended booms. The main frame platform may be controlled locally by sensors utilizing GPS (or other positioning technology) or remotely by a computer or even a live operator. The device may allow for real-time precise delivery of pro-growth materials to plants.

Figure 1:
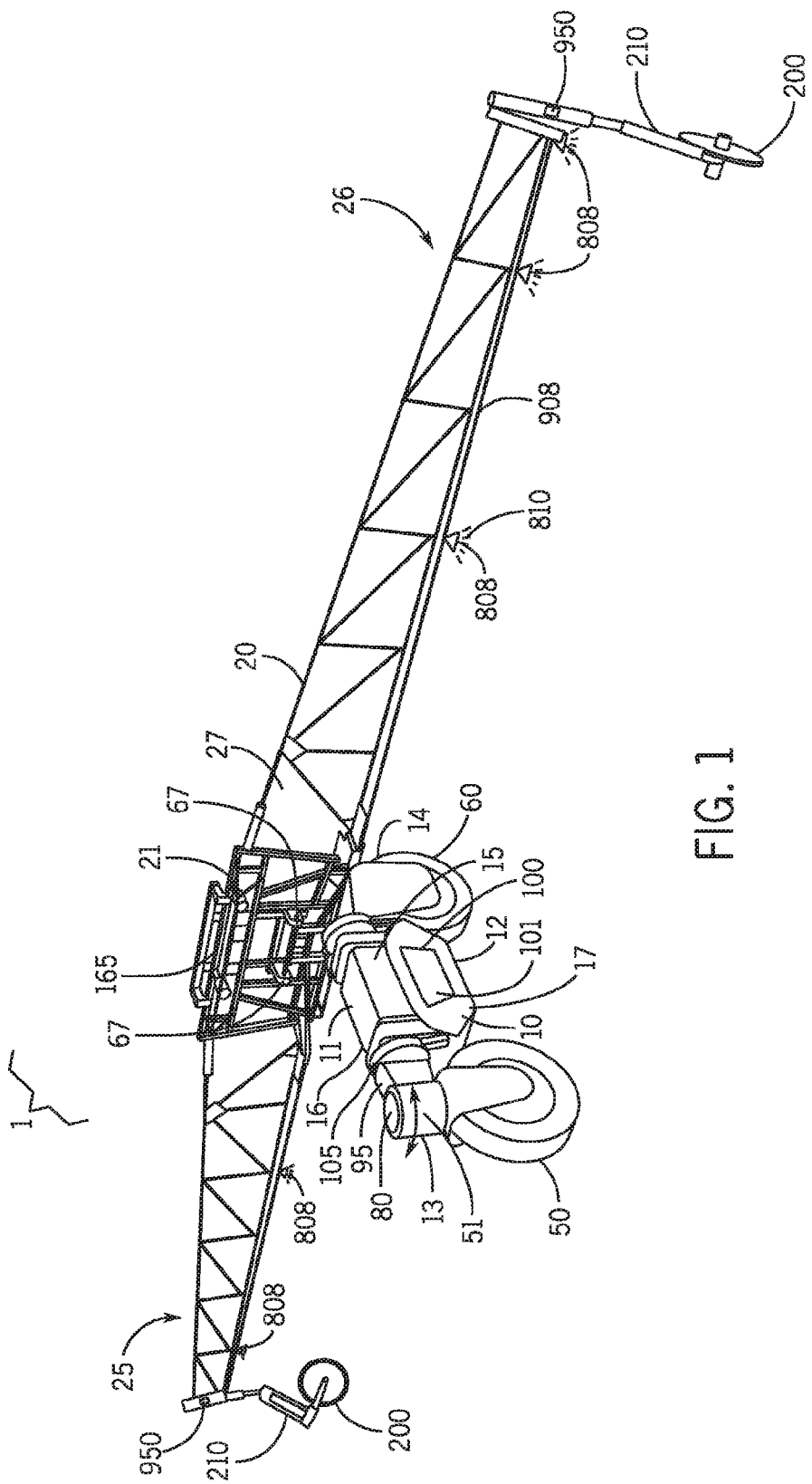
FIG. 1 illustrates a perspective view of the autonomous spraying platform in the un-folded (functional) second orientation.
Figure 2:
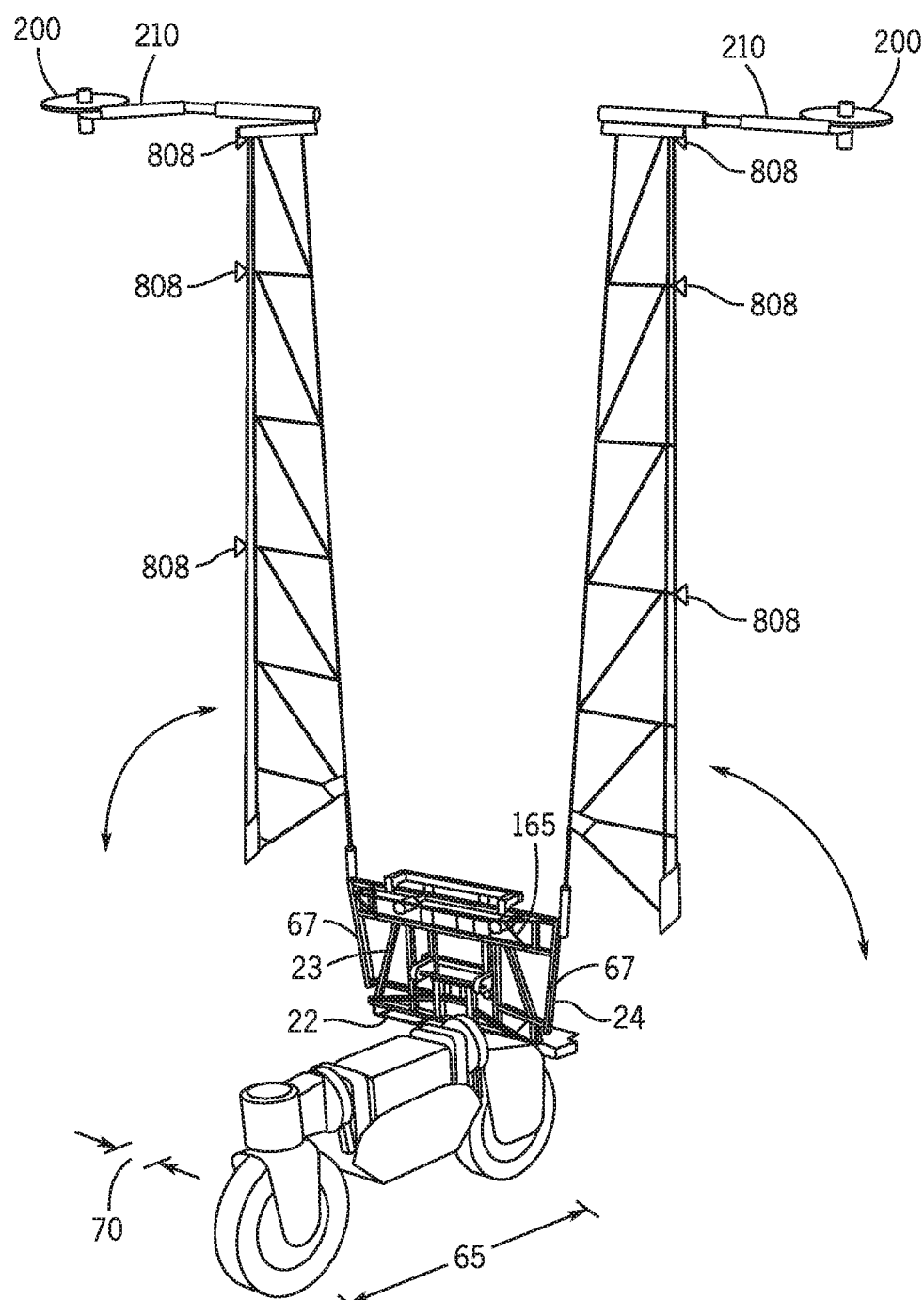
FIG. 2 illustrates a perspective view of the extended boom portion in a generally upward folded first orientation.
Figure 5:
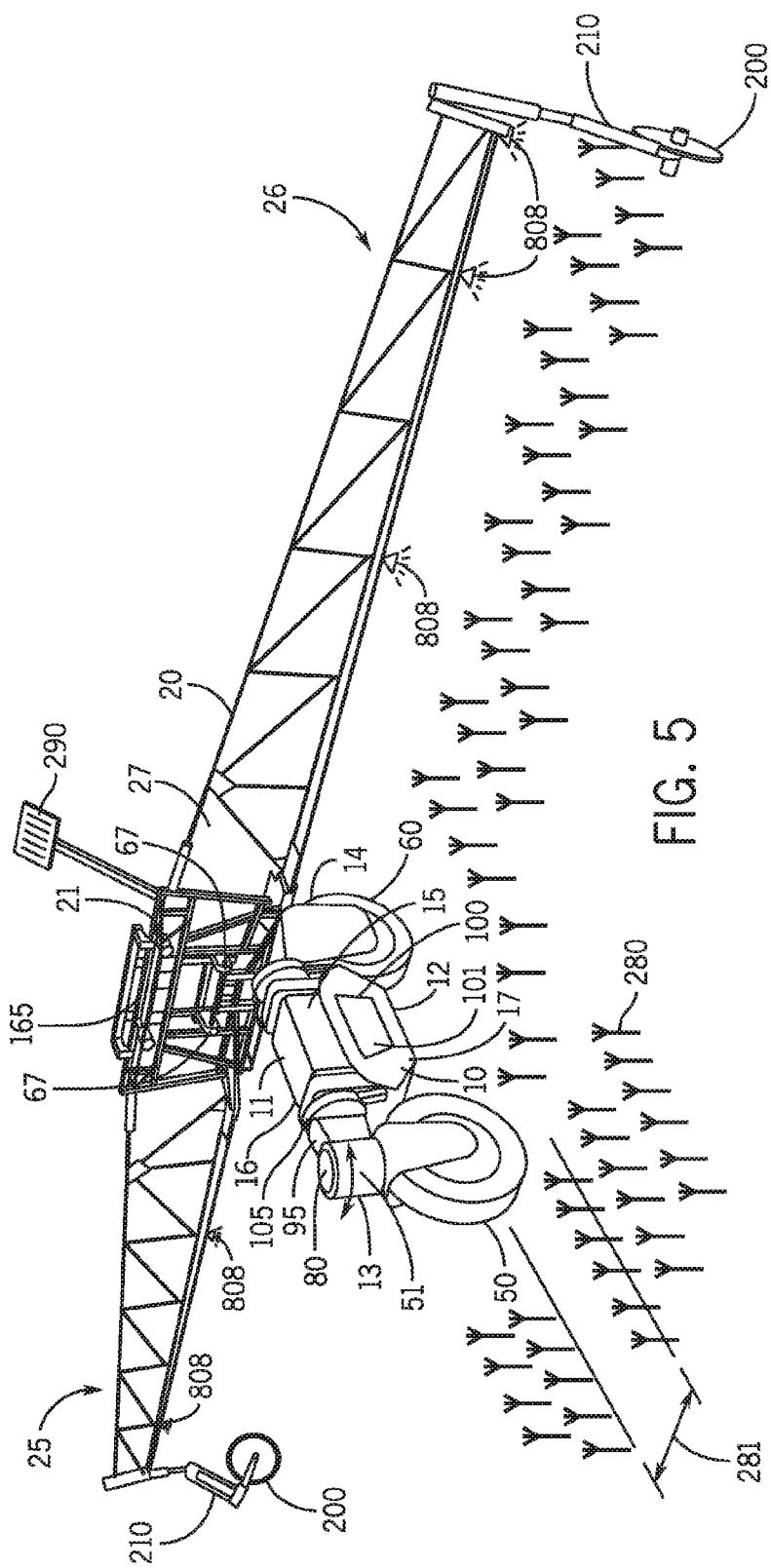
FIG. 5 illustrates the autonomous spraying platform moving through a row of crops.

Referring first to FIG. 1, in an embodiment, an autonomous spraying platform 1 is provided. The autonomous spraying platform 1 may deliver, for example, liquids, powders, foams or air to crops 280 (FIG. 5). The autonomous spraying platform 1 may have a main frame portion 10 and an extended boom portion 20. The main frame portion 10 may have a top 11, a bottom 12, a front 13, a back 14, a first side 15, a second side 16 and an interior portion 17. Further, the main frame portion 10 may have a length 65 (FIG. 2) defined by the distance from the front 13 to the back 14 and a width 70 defined by the distance from the first side 15 to the second side 16.

Figure 4:
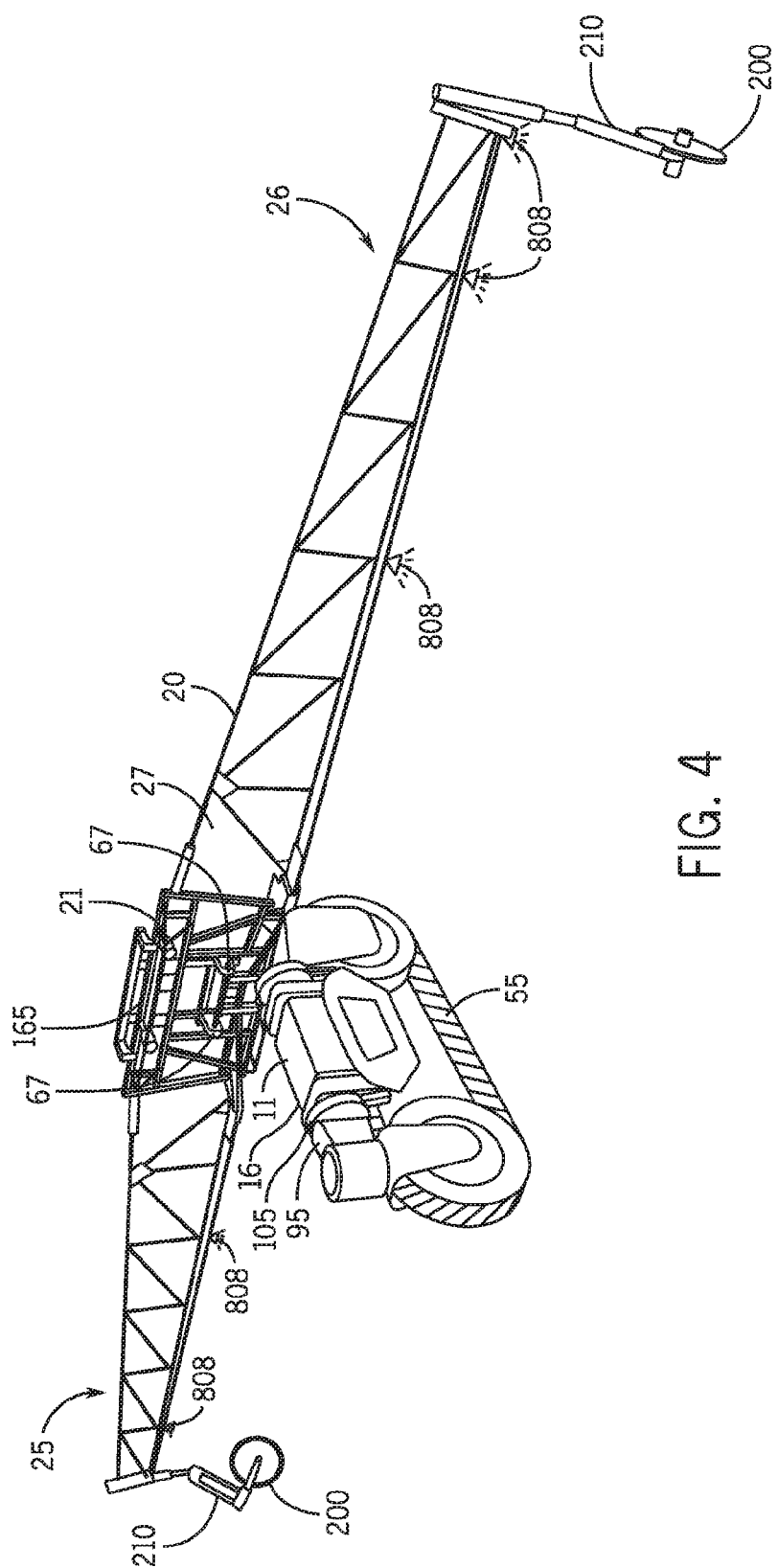
FIG. 4 illustrates an alternative embodiment wherein the device utilizes a track as opposed to wheels.

In an embodiment, the main frame portion 10 may be balanced by and supported by a first wheel 50 and a second wheel 60 wherein the first wheel 50 and the second wheel 60 are in tandem to each other similar to a bicycle or motorcycle. In an alternative embodiment, the device 1 may utilize a track system 55 (See FIGS. 4 and 7). In an embodiment of the track system 55, the tracks may be cleated. Providing a first wheel 50 and a second wheel 60 in tandem to each other reduces the overall width 70 of the device 1. More specifically, most agricultural spraying machines have at least four wheels aligned like a standard automobile. In particular, the overall width of these standard agricultural spraying machines is substantially greater than the present device 1. As a result, whereas these standard agricultural spraying machines require a path to be created in the crop 280 filed (therein consuming valuable space which could otherwise be productive), the present device 1 requires no path. Instead, because of the reduced overall width 70, the present device 1 may travel through the field without a set path. This further gives the farmer the flexibility to spray, for example, chemicals or water the crops 280 at virtually any location in the field. Thus, preferably, the overall width 70 of the device 1 is less than the distance between 281 (FIG. 5) two rows of crops 280 so that the device 1 may easily travel between virtually any two rows of crops 280.

In an embodiment, the device 1 may be driven by electric hub motors 95. The electric hub motors 95 may be secured to a drive shaft (not shown) which is connected to the first wheel 50 and/or second wheel 60. The electric hub motors 95 may provide an environmentally friendly power source to move the device 1 through the crops 280. In an alternative embodiment, a solar panel 290 (FIG. 5) may be secured to the main frame portion 10 or the extended boom portion 20 and may provide at least some of the power source to power the electric hub motors 95. In an alternative embodiment or incorporating the same, the first wheel 50 and/or the second wheel 60 may be flywheels capitalizing on the rotational energy of the weight of the device 1 for balance. In still another embodiment, the device 1 may be partially powered by swappable batteries which power the hub motors 95 and may further utilize a super capacitor to enable quick charging and uninterrupted power during a swap of the power source.

In an embodiment, the extended boom portion 20 may have a central frame unit 165 having atop 21, a bottom 22 (FIG. 2), a front 23 and a back 24. Connected to the central frame unit 165 may be a first side arm 25 and a second side arm 26 wherein the first side arm 25 and the second side arm 26 each have an interior portion 27. In an embodiment, the central frame unit 165 of the extended boom 20 may be generally rectangular and may remain stationary (secured to the main frame portion 10) while first side arm 25 and the second side arm 26 may pivot with respect to the central frame unit 165. In particular, in an embodiment, the first side arm 25 and the second side arm 26 of the extended boom portion 20 may move from a first orientation (FIG. 2) to a second orientation (FIG. 1) and back again. In the first orientation, the first side arm 25 and the second side arm 26 of the extended boom portion 20 may be generally folded upward whereas in the second orientation the first side arm 25 and the second side arm 26 of the extended boom portion 20 may be extended outward at approximately a one hundred and eighty degree orientation with respect to each other. In the second orientation, the device 1 may be ready for use.

Figures 3A, 3B:
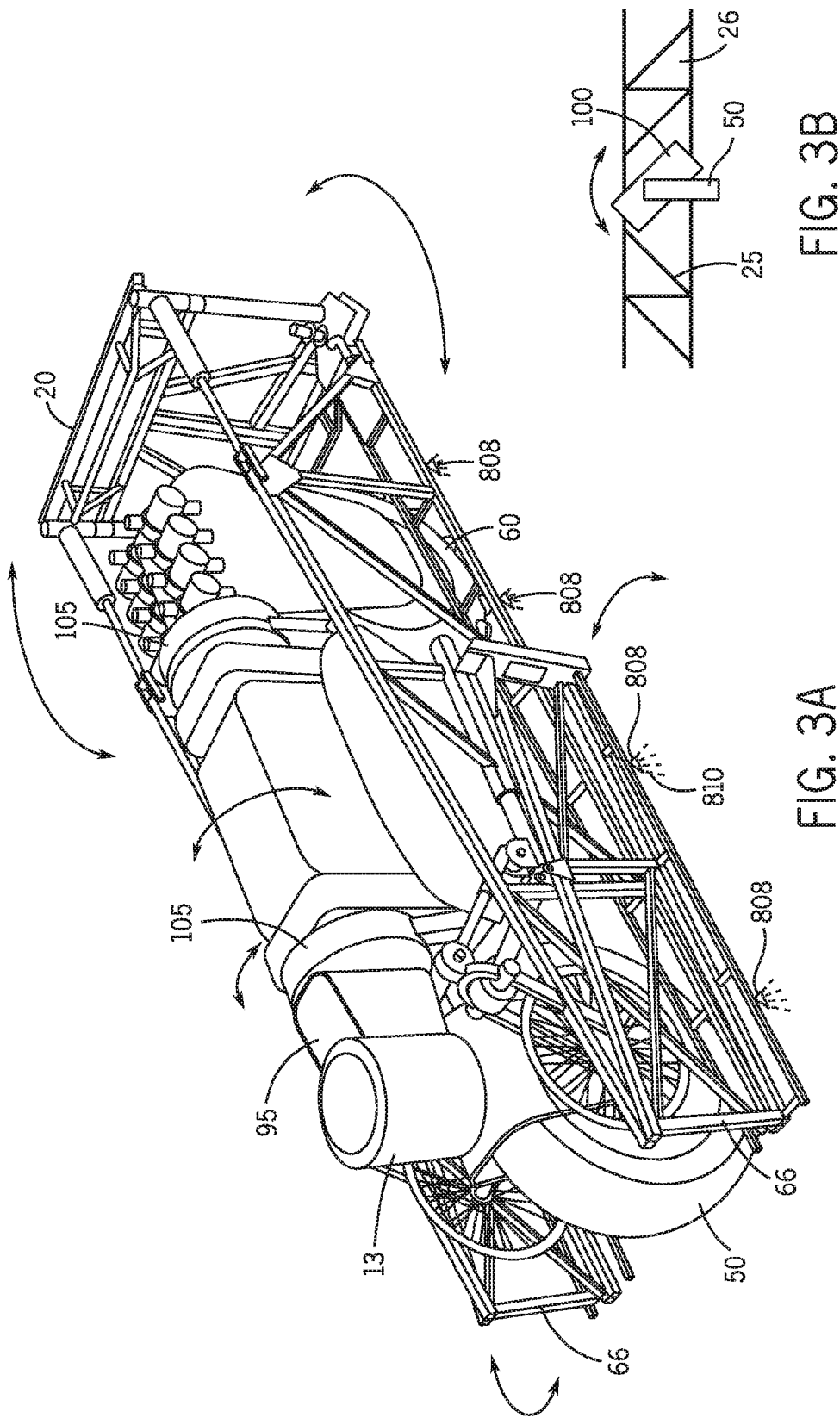
FIG. 3A illustrates a perspective view of the extended boom portion in a generally forward folded third orientation.
FIG. 3B illustrates a front view of the autonomous spraying device wherein the product tank is tilted to maintain balance while the wheels and first side arm and second side arm of the extended boom remain parallel to the ground.

Referring now to FIG. 3, in an embodiment, instead of folding upward (FIG. 2) the first side arm 25 and the second side arm 26 of the extended boom portion 20 may instead move between the second orientation (FIG. 1) and the third orientation (FIG. 3). In the third orientation, the first side arm 25 and the second side arm 26 of the extended boom portion 20 may rotate forward, therein largely covering the first side 15 and the second side 16 of the main frame portion 10 of the device 1. Further, in this embodiment, each arm 25, 26 of the extended boom portion 20 may itself fold generally in half so as to reduce the overall length of the device 1 when the device 1 is being transported or stored. More specifically, the first side arm 25 and the second side arm 26 may fold at a hinge 66 located approximately in the middle of the first side arm 25 and the second side arm 26. In an embodiment, the first side arm 25 and the second side arm 26 may be selectively rotated upward toward the first orientation or selectively rotated forward toward the third orientation. In an embodiment, the device may further be functional in the third orientation, therein allowing an operator to spray the liquids, the foams or the powders while the first side arm 25 and second side arm 26 are rotated forward. Still further, if the first side arm 25 and the second side arm 26 are folded roughly in half (as illustrated in FIG. 3A), the multiple openings 808 may allow the operator to electively double the spraying capacity over a specific area as a result of the openings 808 of the extended boom 20 being brought together in a folded manner.

In the first orientation, the first side arm 25 and the second side arm 26 may be located upward approximately directly over the central frame unit 165. The first side arm 25 and the second side arm 26 may then rotate downward toward the second orientation (FIG. 1) by a pivot pin 67. The rotation of the first side arm 25 and the second side arm 26 may be accomplished by motor (not shown) or may be manual.

In an embodiment, near the bottom 12 of the main frame portion 10 may be a product tank 100. The product tank 100 may have an interior 101 for holding a liquid such as, for example, water or an agricultural chemical, a foam, a powder or the like. Preferably, the product tank 100 is secured between the first wheel 50 and the second wheel 60 and located fairly close to the ground so as to maintain a low center of gravity to increase stabilization of the device 1. Further, in an embodiment, the product tank 100 may be mounted to controlled pivoting frame supports 105. The controlled pivoting frame supports 105 may be located between the main body frame 10 and the first wheel 50 and between the main body frame 10 and the second wheel 60.

The controlled pivoting frame supports 105 may allow the product tank 100 to pivot (FIG. 3B) with respect to the first wheel 50 and the second wheel 60. In particular, the product tank 100 may rotate approximately forty degrees in each direction with respect to the directly below the device 1 (thus, having a range of eighty degrees total). Allowing the product tank 100 to pivot slightly allows the device 1 to maintain its balance and stability. Liquids, foams or powders 810 held in the interior of the product tank 100 may travel through the first side arm 25 and/or the second side arm 26 through a tube 908 and may exit through openings 808 located along the first side arm 25 and the second side arm 26. In the powder embodiment, the powder may be forced through the device 1 with the aid of compressed air. Further, the product tank 100 may rotate at approximately a ninety degree axis with respect to the axis of the first wheel 50 and the second wheel 60 when the first wheel 50 and the second wheel 60 are parallel.

In an embodiment, the product tank 100 is removable from the main frame 10 for replacement and/or repair. Further, the product tank 100 may be removed from the main frame portion 10 so as to allow a user to easily and quickly swap the liquids, foams or powders 810 being dispensed to the crops 280 without the need to first flush the product tank 100 to eliminate the previous liquids, foams or powders 810 being held by the product tank 100.

Located on, for example, the top 11 of the main frame 10 portion may be an antenna 80. The antenna 80, for example, may be secured to a positioning system utilizing, for example GPS, for accurately recording the location of the device 1 and for allowing the device 1 to be properly guided by the controllers or by sensors. The antenna 80 may receive preprogrammed information from a computer automatically directing and controlling the device 1 or the antenna 80 may receive real-time control instructions from a live operator.

In an embodiment, at swivel joint 51 may allow at least the first wheel 50 to be rotated. As a result, the device 1 may have front-wheel steering. It should be understood that the device 1 may implement rear or even dual wheel steering in alternative embodiments. In an embodiment, the first wheel 50 and the second wheel 60 may be thick, knobbed tires so as to increase traction and durability.

In an embodiment, the device 1 may have a gyroscope (not shown) located within the interior portion 17 of the main body frame 10. The gyroscope may self-balance therein allowing the device 1 to automatically adjust to the contours of the environment in real-time so as the first side arm 25 and the second side arm 26 may maintain a consistent distance above the crops 280 that are being treated. As a result, the crops may receive uniform spraying.

In an embodiment, a wheel 200 may be present at the distal end of the first side arm 25 and/or the second side arm 26 of the extended boom portion 20. The wheels 200 at the distal ends of the first side arm 25 and the second side arm 26 may merely be utilized for balance of the device 1 and not for support. The wheels 200 may have shock absorbers 210 connected to sensors 950 which help keep the device 1 upright. Further, the sensors 950 may allow the first side arm 25 and the second side arm 26 to slightly rotate up or down so that the distal ends of the first side arm 25 and the second side arm 26 remain a fairly constant distance above the ground. Having the first side arm 25 and the second side arm 26 at fairly constant distance above the crops 280 allows the device 1 to properly deliver the liquid, the foam or the powder stored in the product tank 100 to the crops 280 in the correct dosages.

Figure 6:
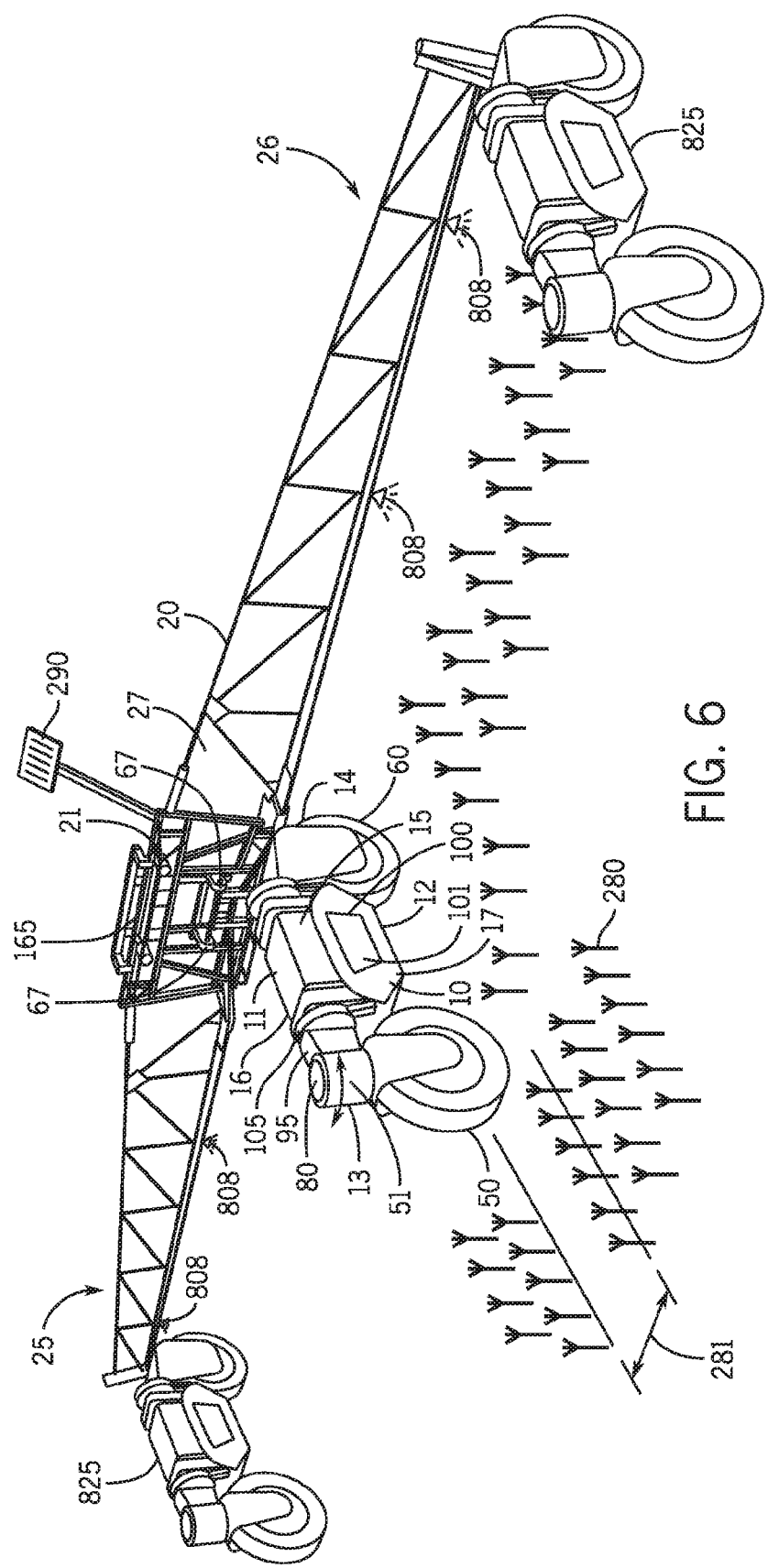
FIG. 6 illustrates an alternative embodiment wherein distal ends of the extended boom portion each have a movable main frame unit.

FIG. 6 illustrates an alternative embodiment wherein the extended boom portion 20 has a main frame unit 825 on both ends of the extended boom portion 20. In this embodiment, the three main frame units 825 may each have a movable front wheel which move in unison with the central main frame unit 10. In an embodiment, the main frame units 825 on the distal ends of the extended boom portion 20 may be largely identical in size and shape as the central main frame unit 10. As a result of multiple main frame units 825 (FIG. 6) the device 1 may therein have additional power and speed. In an alternative embodiment (not illustrated) the main frame units 825 at the distal ends of the extended boom portion 20 may utilize tracks similar to the FIG. 7 tracks.

Figure 7:
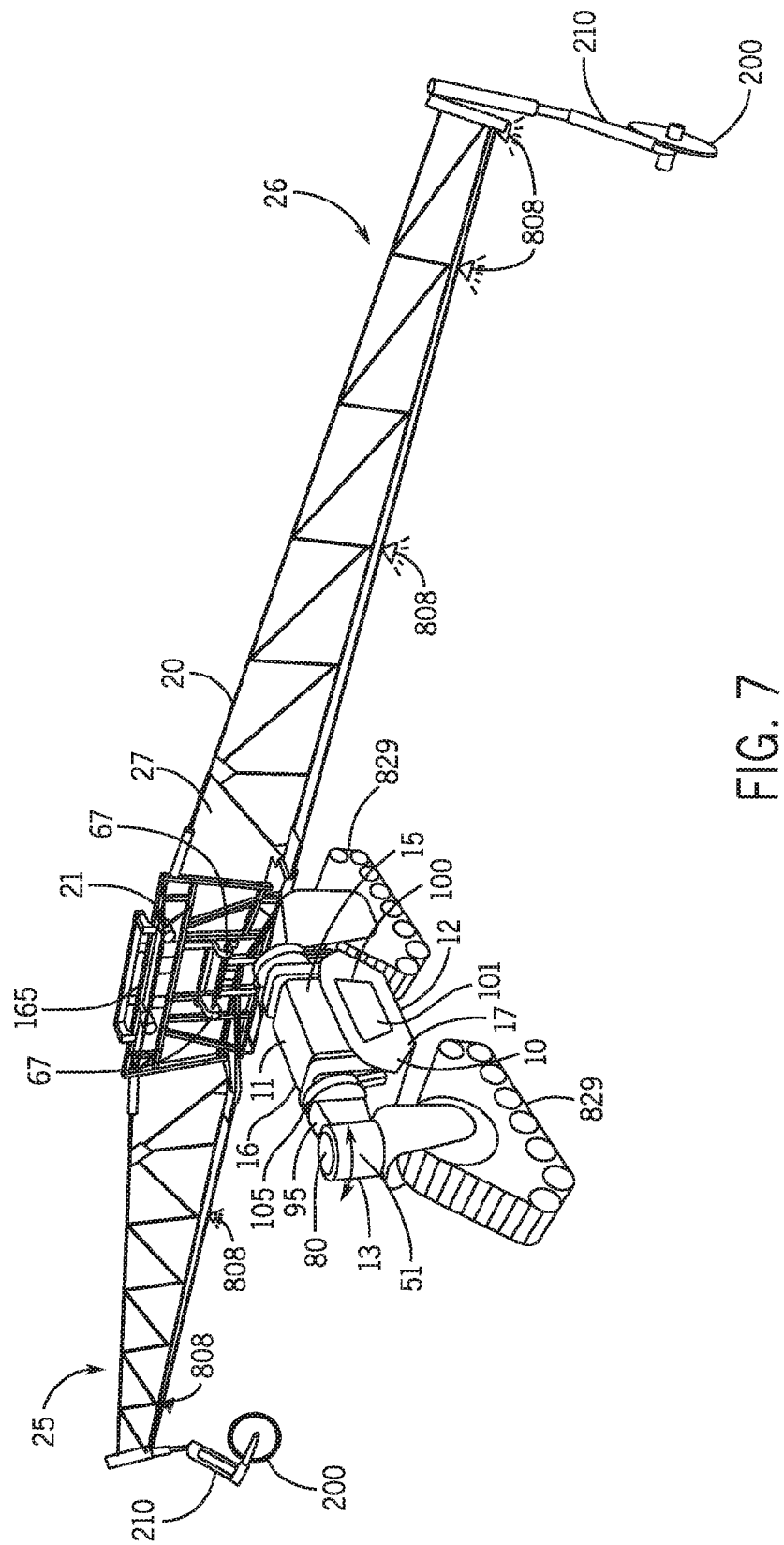
FIG. 7 illustrates an alternative embodiment wherein the device utilizes a track system in the front and in the back of the main frame unit.

FIG. 7 illustrates an alternative embodiment of the device wherein the device utilizes a first and a second track unit 829. The first and second track unit 829 may independently move, allowing the device 1 to properly steer.

Although embodiments of the invention are shown and described therein, it should be understood that various changes and modifications to the presently preferred embodiments will be apparent to those skilled in the art. Such changes and modifications may be made without departing from the spirit and scope of the invention and without diminishing its attendant advantages.

We claim:

1. A movable spraying platform for dispensing a liquid, a gas, or a powder to a field, comprising:
   a main frame portion having a top surface, a bottom surface, a front, a first side, a second side a back and a reservoir tank having an interior for storing a liquid, a gas, or a powder wherein the reservoir tank has a top surface;
   an extended boom having a central frame unit, a first side arm and a second side arm wherein the first side arm and the second side arm each have a first side, a second side, a top surface, a bottom surface, a front and a back and wherein the central frame unit of the extended boom is secured to the top surface of the main frame portion;

wherein the first side of the first side arm and wherein the first side of the second side arm are secured to the central frame unit of the extended boom;

a first and a second rotating wheel secured to the bottom surface of the main frame portion wherein the first or second rotating wheel is capable of steering the main frame portion wherein the first and the second rotating wheel are in tandem like and wherein the first and the second wheel are generally perpendicular with respect to the extended boom and wherein no other wheels are located on the bottom surface of the main frame portion;

a tube connecting the interior of the reservoir tank to at least one opening on the extended boom wherein the opening is capable of dispensing the liquid, the gas, or the powder held in the interior of the reservoir tank;

a pivoting frame support located on the main frame portion wherein the pivoting frame support is capable of allowing the reservoir tank to rotate at a ninety degree axis with respect to an axis of the tandem first wheel and with respect to the second wheel therein allowing the movable spraying platform to self-balance and wherein the pivoting of the reservoir tank is toward the first side or the second side of the frame support and wherein the top surface of the reservoir tank rotates but remains approximately the same distance from the ground; and a first hinge located between the first side arm of the extended boom and the central frame unit and a second hinge located between the second side arm of the extended boom and the central frame unit of the extended boom.

2. The movable spraying platform for dispensing a liquid, a gas, or a powder to a field of claim 1 further comprising:
a third wheel secured to the second end of the first side arm and a fourth wheel secured to the second end of the second side arm.

3. The movable spraying platform for dispensing a liquid, a gas, or a powder to a field of claim 2 wherein the third wheel and the fourth wheel are capable of allowing the movable spraying platform to balance.

4. The movable spraying platform for dispensing a liquid, a gas, or a powder to a field of claim 1 wherein the first hinge and the second hinge of the extended boom is capable of allowing the first side arm of the extended boom to rotate with respect to the central frame unit and wherein the second hinge of the extended boom is capable of allowing the second side arm to rotate with respect to the central frame unit of the extended boom.

5. The movable spraying platform for dispensing a liquid, a gas, or a powder to a field of claim 4 wherein the first side arm of the extended boom and the second side arm of the extended boom rotate approximately ninety degrees forward, toward the front of the movable spraying platform.

6. The movable spraying platform for dispensing a liquid, a gas, or a powder to a field of claim 4 wherein the first side arm of the extended boom and the second side arm of the extended boom rotate approximately ninety degrees upward above the movable spraying platform.

7. The movable spraying platform for dispensing a liquid, a gas, or a powder to a field of claim 1 further comprising:
a GPS locating system secured to the movable platform wherein the GPS locating system is capable of determining the location of the movable spraying platform.

8. The movable spraying platform for dispensing a liquid, a gas, or a powder to a field of claim 1 further comprising:
a third hinge located approximately halfway between the first side and the second side of the first side arm of the extended boom and a fourth hinge located approximately halfway between the first side and the second side of the second side arm of the extended boom wherein the third and fourth hinge are capable of allowing the first side arm and the second side arm of the extended boom to fold approximately in half.

9. The movable spraying platform for dispensing a liquid, a gas, or a powder to a field of claim 1 further comprising:
a solar panel secured to the main frame portion or the central frame unit of the extended boom wherein the solar panel is capable of supplying at least a portion of the power to move the movable spraying platform.

10. The movable spraying platform for dispensing a liquid, a gas, or a powder to a field of claim 1 wherein the first wheel and or the second wheel are flywheels which conserve and utilize rotational energy obtained through inertia.

* * * * *